(12) United States Patent
Wilhelmi et al.

(10) Patent No.: US 9,253,940 B2
(45) Date of Patent: *Feb. 9, 2016

(54) AIR ENTRAINMENT DEVICE FOR SEED DELIVERY

(71) Applicant: KINZE MANUFACTURING, INC., Williamsburg, IA (US)

(72) Inventors: Matthew Wilhelmi, Parnell, IA (US); Kenneth E. Shoup, Bonfield, IL (US); Daniel Koop, Parnell, IA (US)

(73) Assignee: Kinze Manufacturing, Inc., Williamsburg, IA (US)

( * ) Notice: Subject to any disclaimer, the term of this patent is extended or adjusted under 35 U.S.C. 154(b) by 163 days.

This patent is subject to a terminal disclaimer.

(21) Appl. No.: 13/858,876

(22) Filed: Apr. 8, 2013

(65) Prior Publication Data

US 2013/0276684 A1    Oct. 24, 2013

Related U.S. Application Data

(63) Continuation of application No. 12/829,654, filed on Jul. 2, 2010, now Pat. No. 8,448,585.

(60) Provisional application No. 61/222,792, filed on Jul. 2, 2009.

(51) Int. Cl.
    *A01C 7/08*    (2006.01)
    *A01C 7/04*    (2006.01)

(52) U.S. Cl.
    CPC .............. *A01C 7/084* (2013.01); *A01C 7/042* (2013.01); *A01C 7/081* (2013.01); *A01C 7/082* (2013.01)

(58) Field of Classification Search
    CPC ............ A01C 7/18; A01C 7/084; A01C 7/08; A01C 7/00; A01C 7/042; A01C 7/04; A01C 7/081; A01C 7/082
    USPC ........... 111/52, 170, 174, 175, 183–185, 189, 111/900, 925; 198/493, 955; 221/189.11, 221/263, 284, 318, 321.1, 330, 373, 399
    See application file for complete search history.

(56) References Cited

U.S. PATENT DOCUMENTS 4,771,912  A  *  9/1988  van Wingerden ............... 221/75
4,852,809  A  *  8/1989  Davis et al. .................... 239/654

(Continued)

FOREIGN PATENT DOCUMENTS

RU    2228586 C2    7/2003

OTHER PUBLICATIONS

RU 2 228 586 C2—English Abstract.

*Primary Examiner* — Christopher J Novosad
(74) *Attorney, Agent, or Firm* — McKee, Voorhees & Sease, PLC (57) ABSTRACT

A seed delivery device including a frame defining at least one seed chamber. The frame includes a sidewall and an air permeable floor. Seed can be received and deposited on the air permeable floor through an input port. An air input channel is utilized to introduce an air stream into the seed chamber and direct it through the air permeable floor such that seed is lifted from the air permeable floor to an outlet port. An air bypass channel is configured to separate the air stream into a first stream that is directed through the air permeable floor and a second stream that is directed through the bypass channel and recombined with the first stream, at a point prior to the output port, to prevent excess accumulation of seed in the seed chamber.

20 Claims, 8 Drawing Sheets

(56) References Cited

U.S. PATENT DOCUMENTS

| | | |
|---|---|---|
| 5,379,706 A | 1/1995 | Gage et al. |
| 6,047,652 A | 4/2000 | Prairie et al. |
| 6,176,393 B1 * | 1/2001 | Luxon .......................... 221/211 |
| 6,494,154 B2 | 12/2002 | Kinzenbaw et al. |
| 6,845,724 B2 | 1/2005 | Mayerle et al. |
| 7,021,224 B2 | 4/2006 | Mayerle et al. |
| 7,025,010 B2 | 4/2006 | Martin et al. |
| 7,182,029 B2 | 2/2007 | Johnson et al. |
| 7,213,525 B2 | 5/2007 | Meyer et al. |
| 7,938,072 B2 | 5/2011 | Wilhelmi et al. |
| 8,234,987 B2 | 8/2012 | Georgison |
| 8,276,530 B2 | 10/2012 | Anderson et al. |
| 8,448,585 B2 * | 5/2013 | Wilhelmi et al. ............ 111/175 |
| 8,800,458 B1 * | 8/2014 | Wilhelmi et al. ............ 111/175 |
| 2004/0159669 A1 * | 8/2004 | Pollard et al. ................ 221/278 |
| 2008/0295751 A1 | 12/2008 | Shoup et al. |
| 2012/0174840 A1 | 7/2012 | Friggstad |

* cited by examiner

FIG. 8 ial planters typically include...

AIR ENTRAINMENT DEVICE FOR SEED DELIVERY

CROSS-REFERENCE TO RELATED APPLICATIONS

This application is a continuation of U.S. patent application Ser. No. 12/829,654, filed Jul. 2, 2010, which claims priority to U.S. Provisional Patent Application No. 61/222,792, filed Jul. 2, 2009.

BACKGROUND

Large scale agricultural planters typically include a plurality of individual hoppers and seed metering units. During planting, the hopper holds the mass of seed that the planter distributes onto the ground. The metering units are responsible for delivering the seed to the ground. As the planter moves over the planting surface, it is important that the metering units distribute the seed uniformly and at precise intervals to achieve proper spacing of crops. To achieve such a distribution it is important that the supply of seed to the seed meters is steady and uninterrupted. Accordingly, an apparatus for transporting seed from the hopper to the metering units is the subject of the present application.

Other features and advantages of the present invention will be apparent to those skilled in the art from the following detailed description of the illustrated embodiments, accompanied by the attached drawing wherein identical reference numerals will be used for like parts in the various views.

DETAILED DESCRIPTION

Figure 1:
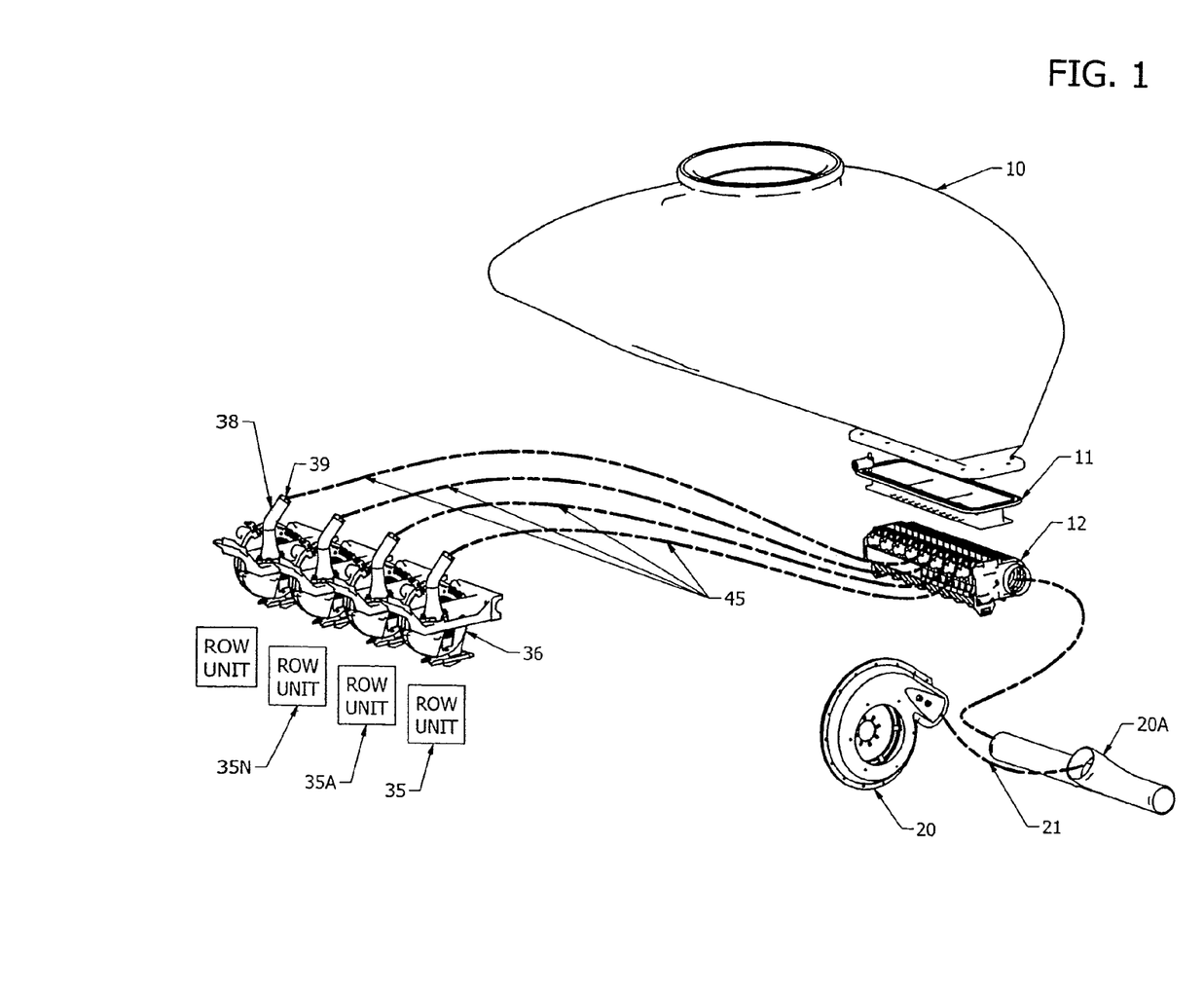
FIG. 1 is a perspective diagram, partly in schematic form, of an air seed delivery system incorporating an air entrainment device in accordance with the present invention.

Referring first to FIG. 1, reference numeral 10 designates a central or main seed hopper for an agricultural row crop planter. In FIG. 1, the planter's forward direction of travel is toward the upper right. The hopper 10 stores seed and feeds it through a lower distribution tray 11 (which may be elongated laterally and mounted to the bottom of the hopper housing) under gravity. The seed is delivered directly from the distribution tray 11 to one or more air entrainment devices in an air entrainment assembly 12. The function of the air entrainment assembly 12, as described in more detail below, is to receive and distribute seed from the hopper 10 to individual seed meters 36, as will be further described below. The seed meters 36 may be conventional air seed meters, for example, the meter disclosed in U.S. Pat. Nos. 7,093,548 and 7,152,542, but other air seed meters may be used, as well, and mechanical seed meters may also be used with the present invention.

The seed meters 36 are integral with conventional planter row units schematically represented at 35, 35A . . . 35N. Thus, the seed meters 36 and row units need not be described in further detail for a complete understanding of the instant invention.

The system can be set up such that the air entrainment assembly 12 has an individual outlet conduit 45 for each individual air seed meter 36. Thus, persons skilled in the art will fully understand the invention, and all its modifications by understanding one air entrainment device 12A and its associated distribution and usage.

As shown in FIG. 1, a fan 20, or other source of pressurized air, forces air through conduit 21 (shown diagrammatically as a line, for simplicity). As explained, the conduit 21 could be a single conduit (as illustrated) or a number of separate conduits, all coupled to the same source of pressurized air, or if there are a number of seed delivery conduits, they also could be grouped so that one or more individual seed delivery conduits could be fed by a single source of pressurized air. Similarly, plural sources of pressurized air could be used with plural seed delivery conduits and seed meters.

One feature of the present invention is the flexibility with which desired systems could be arranged, without substantial increase in costs and with use of standardized, interchangeable sub-assemblies and components.

Still referring to FIG. 1, the blocks 35, 35A, 35N represent individual planter row units which may be conventional, each including a seed meter adapted to receive a seed delivery inlet assembly, such as the one designated 38. The seed meter 36 may be of the type disclosed in the above-identified U.S. patents. A seed inlet assembly 38 is mounted to and provides each individual seed meter 36 with seed. Each inlet assembly 38 includes an input port 39 that is connected to conduit 45. Seed is delivered to the seed reservoir of each meter 36 through an input port 39 within the seed inlet assembly.

As further shown in FIG. 1, fan 20 is connected by a manifold 20A by a means of a hose or conduit diagrammatically shown at 21. Manifold section 20A has plural outlet ports one of which is connected to an input of an associated section of the air entrainment assembly 12. The air source 20 may feed additional manifold sections, as persons skilled in the art will appreciate. The manifold sections 20A may comprise a single, integral conduit feeding pressurized air to all outlets in common. Each manifold section 20A feeds an associated air entrainment assembly 12 as will be described presently, depending on the size of the planter. Each air entrainment assembly 12 has a plurality of outlets each connected to a respective conduit 45 for providing seed under pressure to plural seed meters 36.

Figure 2:
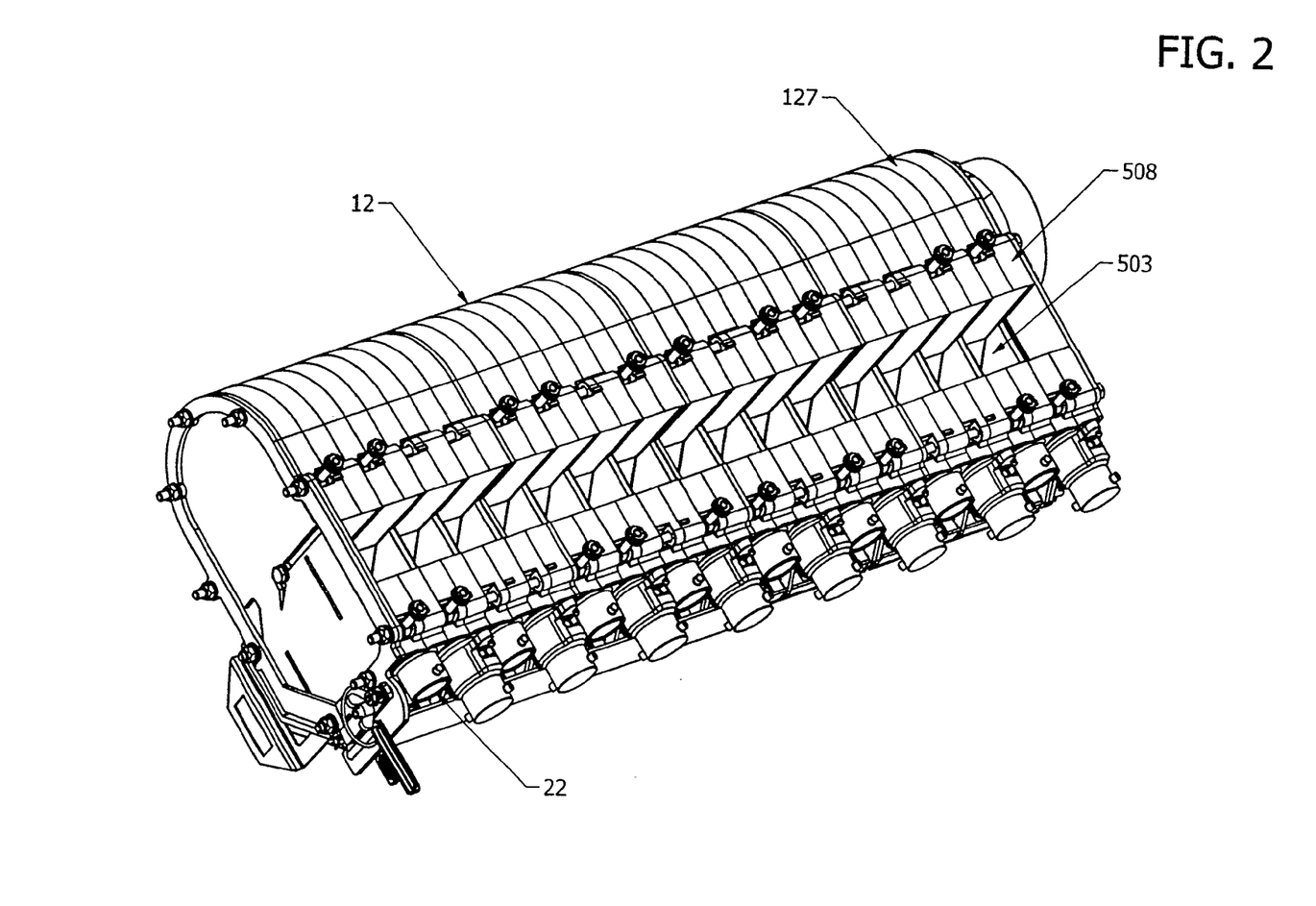
FIG. 2 is an upper perspective view of plural air entrainment devices employed in the system of FIG. 1.
Figure 3:
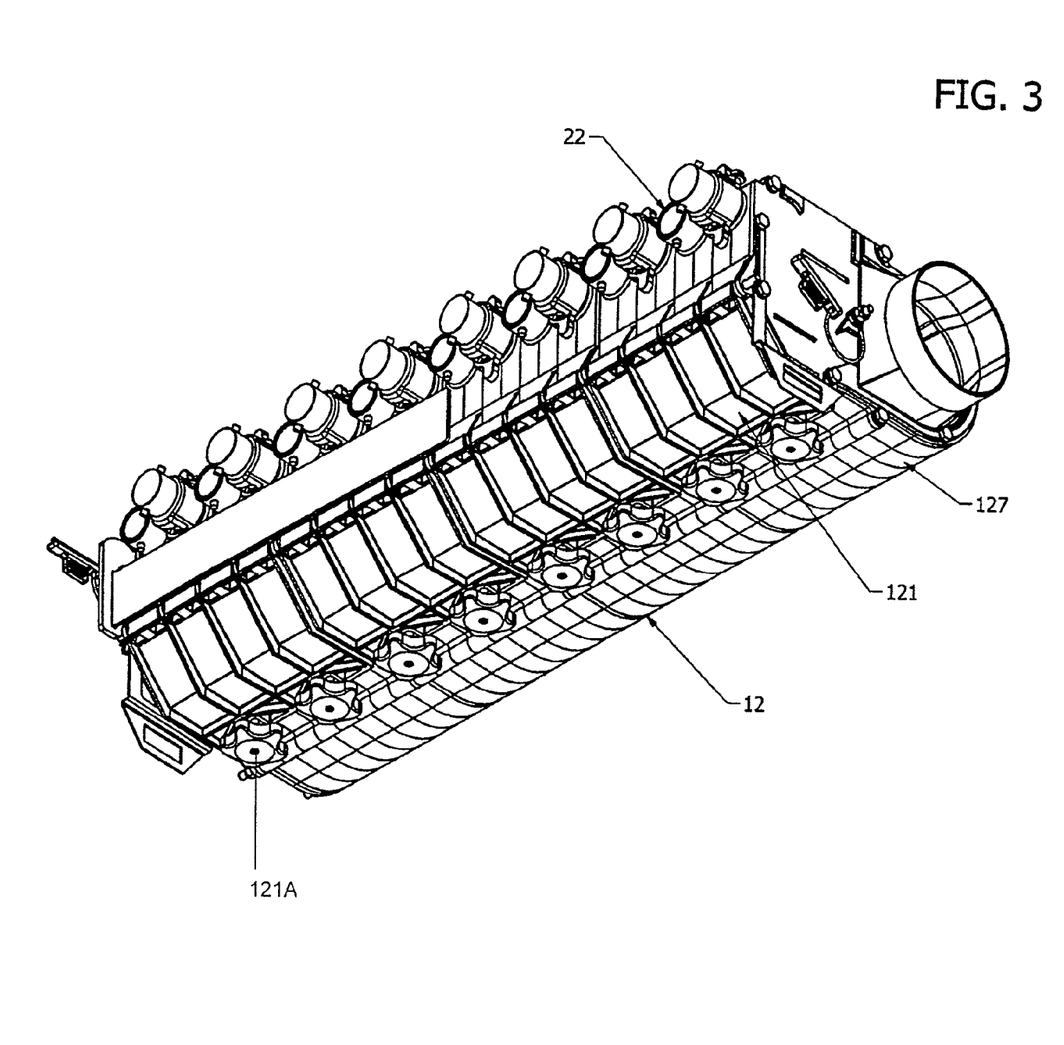
FIG. 3 is a lower rear perspective view of plural air entrainment devices employed in the system of FIG. 1.

Referring to FIGS. 2 and 3, upper and lower perspective views of an exemplary air entrainment assembly frame 12 are respectively shown for illustrative purposes. Air entrainment assembly 12 includes a base assembly 121 and an air distribution assembly 127. In the embodiment shown, base assembly 121 includes eight bases 121A-121H which are each shaped and configured to receive a respective air entrainment device 12A and an air distribution unit 127. Base assembly 121 may include more or less than eight bases, each adapted for attachment to a respective air distribution assembly and air entrainment device. Only one base assembly 121 is shown in the figures for simplicity. It should be noted, however, that base assembly 121 could include more or less bases and each base could include a corresponding air entrainment device depending on need. Each base is in communication with one or more air distribution assemblies 127 attached to that base.

Figure 4:
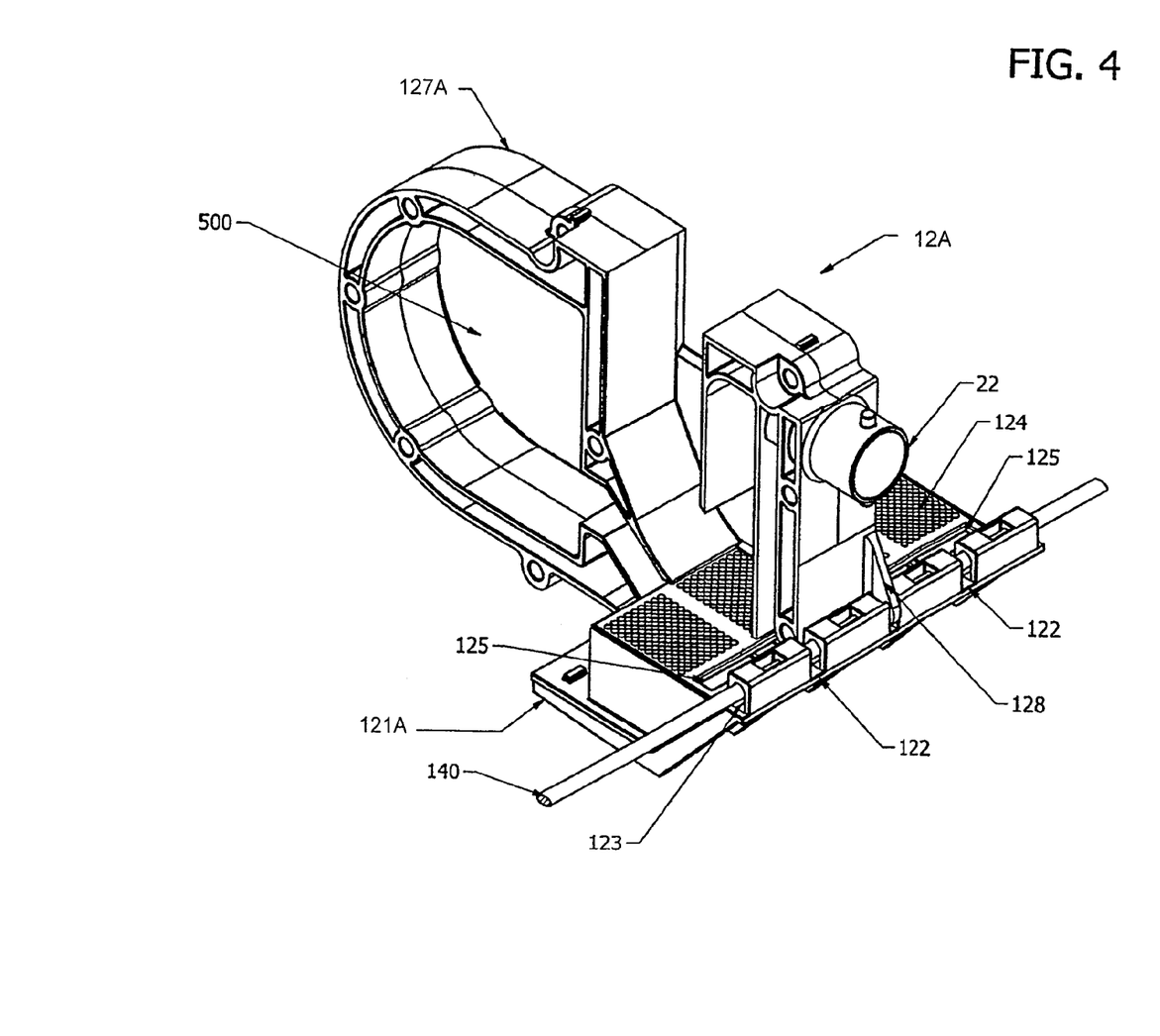
FIG. 4 is an upper left rear perspective view of an air entrainment device shown in FIGS. 2 and 3.

Referring further to FIG. 4, there is shown an upper perspective view of an individual air entrainment device 12A in accordance with the present invention. Base 121 of air entrainment device 12A includes plural spaced recesses 122 in an upper portion of the air entrainment device. Each recess 122 is shaped and configured to receive a hinge portion 128 of distribution assembly 127. A screw or pin 140 is inserted through aligned apertures 123 disposed in an upper portion of base 121. The screw or pin 140 spans each recess 122 and engages a corresponding hinge portion 128 to secure base 121 to the air entrainment device 12A. Further, the hinged relationship allows base to be rotated downwardly about the connecting pin 140 to provide clean-out access for air entrainment device 12A.

Figure 5:
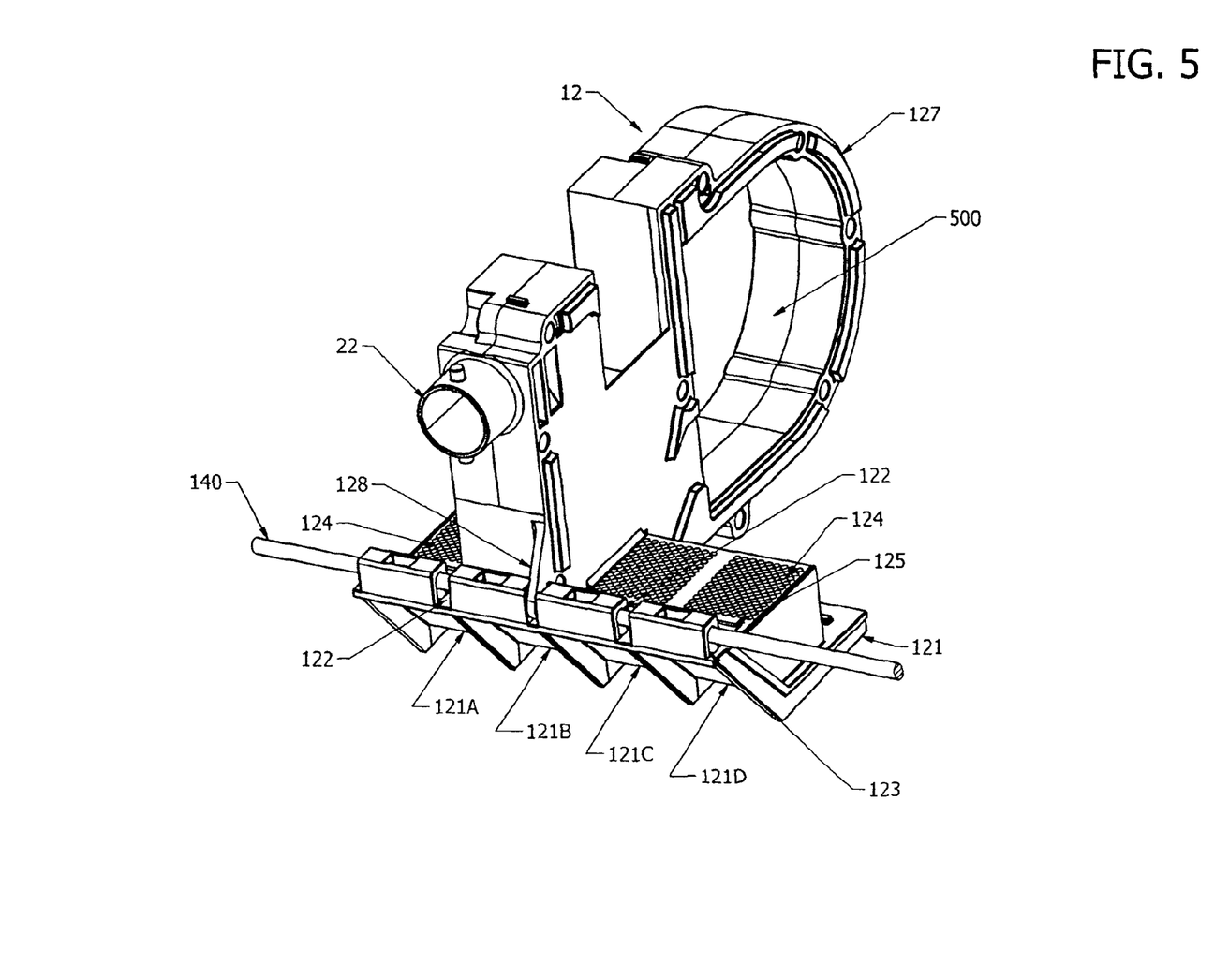
FIG. 5 is an upper right rear perspective view of an air entrainment device shown in FIGS. 2 and 3.
Figure 6:
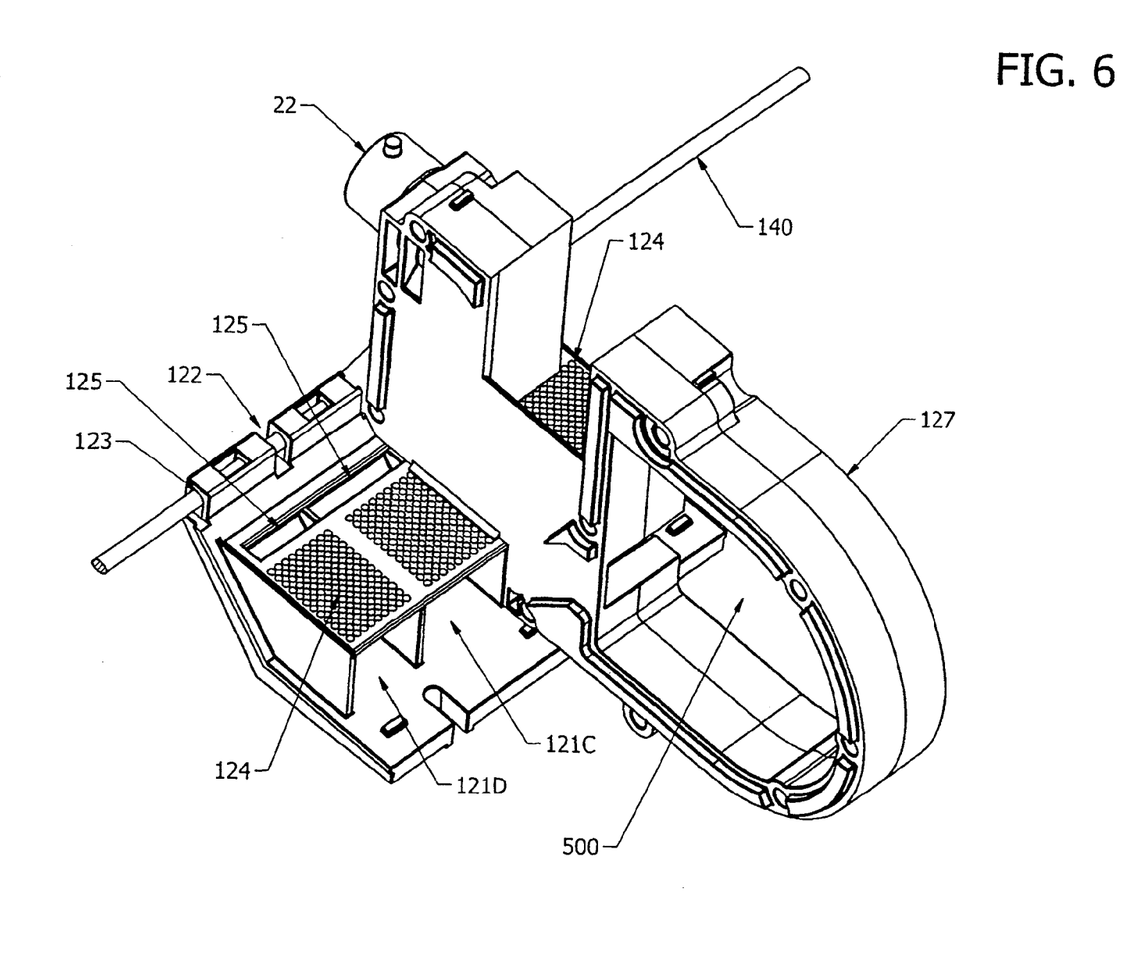
FIG. 6 is an upper front right perspective view of the inventive air entrainment device.
Figure 7:
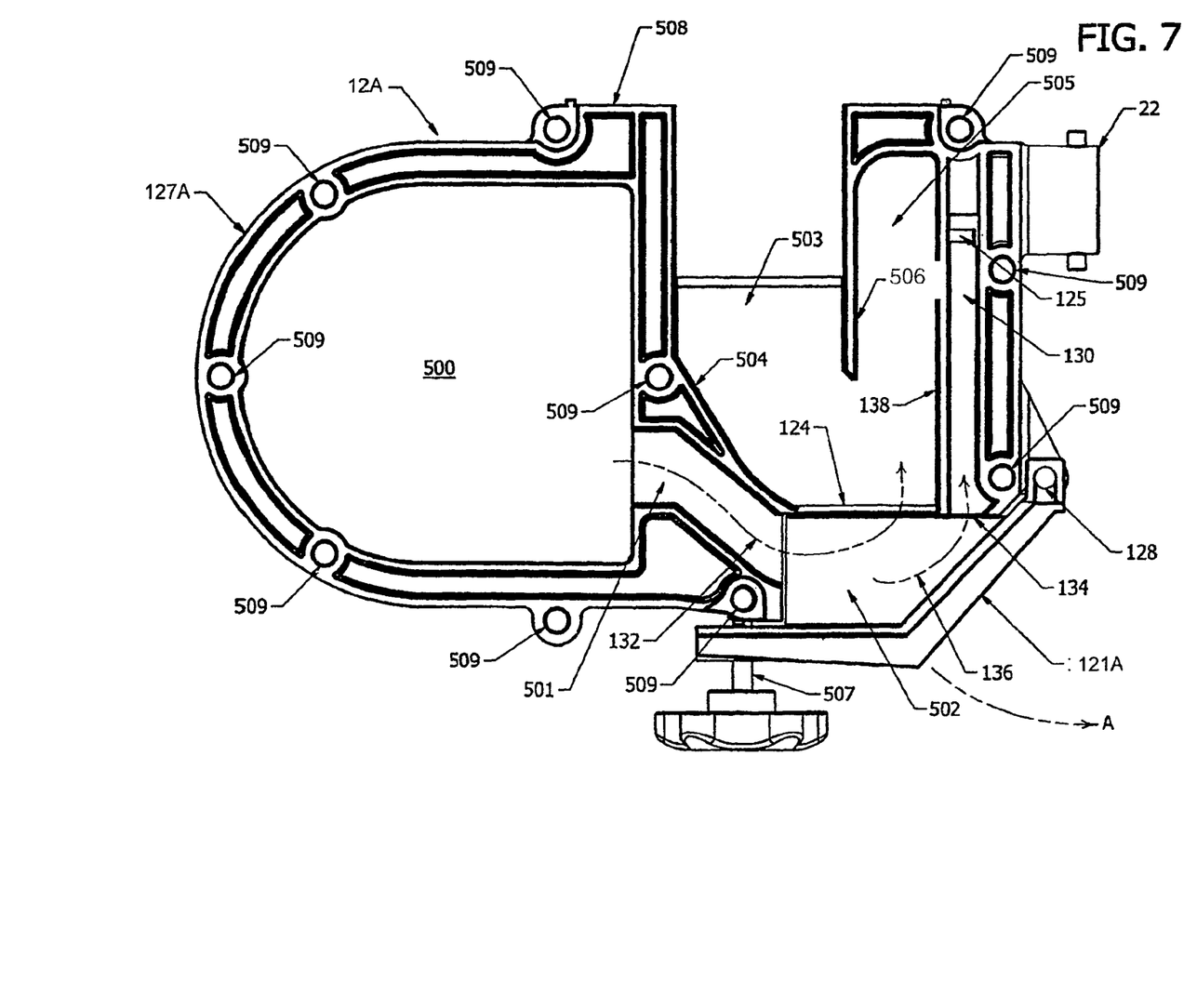
FIG. 7 is a lengthwise vertical sectional view of an air entrainment device in accordance with the present invention.
Figure 8:
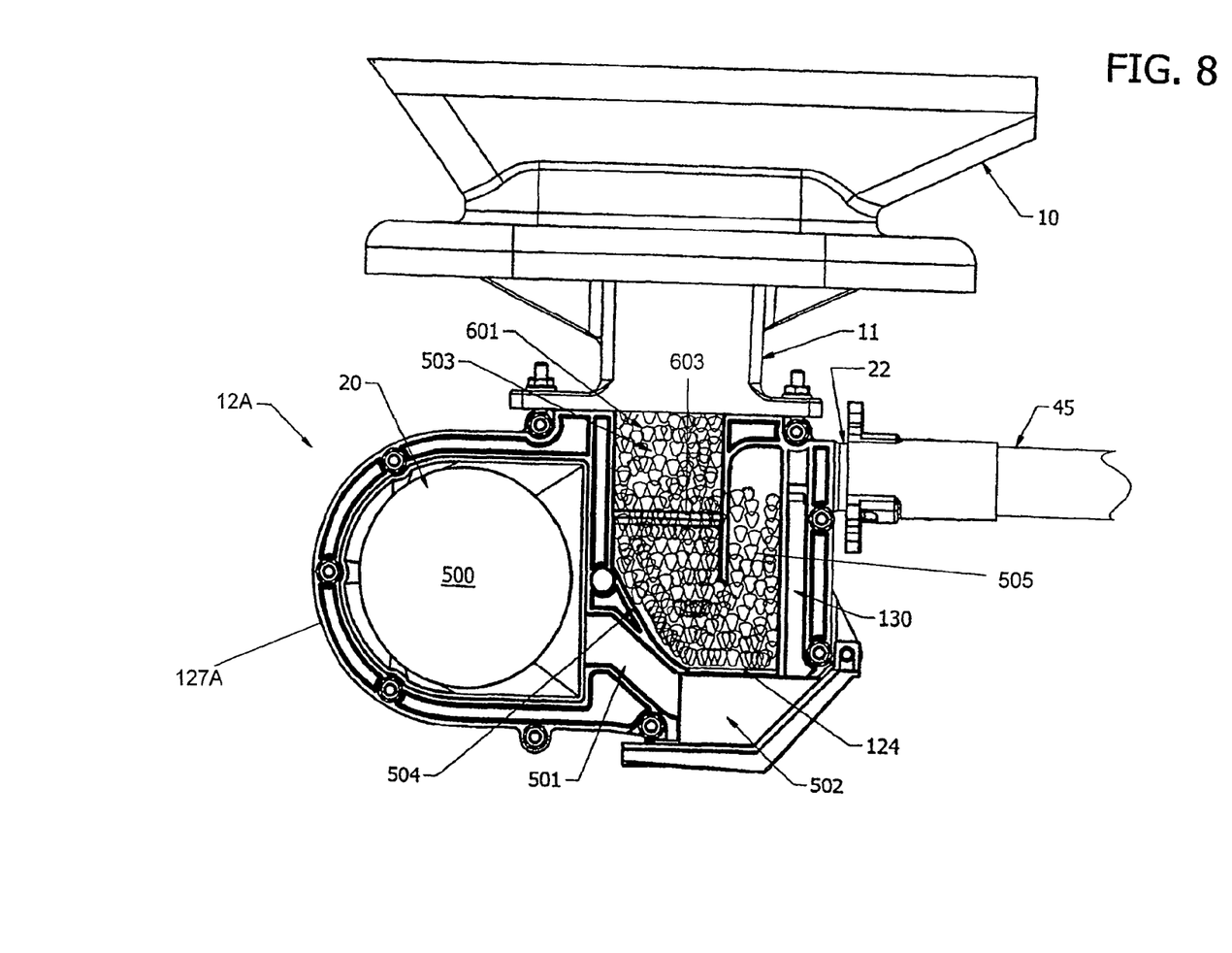
FIG. 8 is a side elevation view shown partially in section illustrating the attachment of the inventive air entrainment device to a seed hopper and the location of seeds transiting the air entrainment prior to delivery to a seed meter.

Referring also to FIG. 4 as well as to FIGS. 5 and 6, which are also upper perspective views of air entrainment device 12A, additional details of the invention will now be described. Air under pressure is introduced into an air manifold 500 of the air entrainment device 12A. The air manifolds of adjacent air entrainment devices 12A are aligned with one another and form a common air distribution assembly 127 (described above) for plural air entrainment devices attached to a common base 121A. Each base 121A includes an air permeable surface or floor, such as a perforated surface 124. As will be described further herein, seed is distributed to air entrainment device 12 from hopper 10 through a seed conduit. The seed falls onto perforated surface 124. When air entrainment device 12A is operational, air flows through perforated surface 124 in the direction of arrow 132 shown in the sectional view of the air entrainment device of FIG. 7. The properties of the perforated surface 124 and the air flow cause agitation of the seeds. This agitation causes mixing and lifting of the seeds into the air flow passing through air entrainment device 12A for discharge through outlet port 22. The dimensions of perforated surface 124 can vary depending on the desired air flow and the seed transported through the air entrainment device 12A. However, openings 0.125 inch in diameter in perforated surface 124 have been shown to be effective. Similarly, the shape of the perforations in the surface 124 can vary, but substantially circular perforations have been shown to be effective.

Air entrainment device 12 further includes an air bypass channel 130 running therethrough as shown in the sectional review of FIG. 7. Air is introduced into the air bypass channel 130 via opening 134 at the lower end of the bypass channel as shown by arrow 136 in FIG. 7. The air bypass channel 130 exits into outlet port 22 via bypass outlets 125. An inner partition 138 within air entrainment device 12A air separates the air flowing through the air entrainment device into two streams. A first stream passes upward through perforated surface 124 and urges seed upward within a seed and air mixing chamber 505 and through outlet port 22. A second stream bypasses perforated surface 124 (and the seed disposed thereon), passes upward through opening 134 and into air bypass channel 130, and recombines with the first air stream at outlet port 22. With the second air stream not encumbered by seed and the cross sectional area of the bypass channel 130 appropriately dimensioned relative to the seed and air mixing chamber 505, the force and/or velocity of the second air stream through bypass channel will be generally greater than that of the first air stream. Accordingly, when recombination of the streams occurs, the second stream will assist the first stream in discharging seed through outlet port 22. This air flow feature is especially helpful in diluting seed flow to prevent blockages and to reduce seed flow in the event of a blockage. This increased air flow more effectively maintains the seed and air flow at outlet 22 as well as in downstream portions of the seed delivery system to prevent blockages. This arrangement also facilitates the flow of seed through the seed and air mixing chamber 505 and reduces the possibility of blockages within the seed entrainment device 12A. Thus, as the number of seeds within the seed throat 503 and the seed and air mixing chamber 505 increases and the air flow through this portion of the air entrainment device decreases, air flow through the air bypass channel 130 increases to clear the seed and air outlet port 22. With the seed and air outlet port 22 cleared, additional seed can be discharged from the seed and air mixing chamber 505 into the seed and air outlet port 22 allowing additional air to flow through the seed and air mixing chamber to facilitate increased seed flow.

As was described in connection with FIG. 1, air is provided from air source 20 into the air distribution unit 127A of each air entrainment device 12A. Air entrainment device 12A includes an air flow channel 500 within its air distribution unit 127A through which air from source 20 is directed. The air flow channel 500 directs air into a chamber 502 located beneath perforated surface 124 as shown in the sectional view of FIG. 7. Meanwhile, seed is provided from hopper 10 through an input port to seed throat 503 and into the seed and air mixing chamber 505. The seed is deposited on inclined wall or surface 504, which is dimensioned such that the seed is deflected onto perforated surface 124. An exemplary angle for inclined surface 504 is on the order of 52° relative to perforated surface 124. As seed is deflected onto perforated surface 124, air exits chamber 502, agitates and mixes the seed, and causes the seed to rise within the air and seed mixing chamber 505. Simultaneously, air is allowed to pass through opening 134 and into bypass channel 130. Air-entrained seed from mixing chamber 505 is then recombined with the air stream from bypass channel 130 at outlet port 22. Seed and air then flows out of outlet port 22 to an associated seed meter 36 through one of the conduits 45 as shown in FIG. 1. A partition 506 separates the seed throat 503 from the seed and air mixing chamber 505. The length of partition 506 is selected so as to limit the rate of seed flow from the seed throat 503 to the seed and air mixing chamber 505 and prevent bridging (blockage) of the seed within the seed and air mixing chamber, particularly when the planter is transiting a steep slope in a field being planted.

Also shown in FIG. 7 are details of the attachment of base 121A to air entrainment device 12A at hinge 128. Air entrainment device 12A includes plural bolts 507 to secure base 121A to the air entrainment device when in use. Bolts 507 can be removed or released allowing base 121A to be rotated in the direction of arrow A such that seed can be removed from seed throat 503, mixing chamber 505, perforated surface 124, and/or outlet port 22 for cleaning out the air entrainment device 12A. Air entrainment device 12A further includes a mounting flange 508 that can be used to secure multiple air entrainment devices together, or in the case of an end unit, to attach an end cover. Mounting flange 508 includes apertures 509 adapted to receive bolts, pins, screws, etc., for securing plural air entrainment devices together.

Referring to FIG. 8, there is shown a partially cutaway side elevation view of air entrainment device 12A in operation. An air source (not shown) provides air through flow channel 500 air distribution unit 127A to air entrainment device 12A. Air flows from air distribution unit 127A through channel 501, into chamber 502, and upward through perforated surface 124. Air engages seed 601 that is deposited in seed throat 503, contacts angled surface 504, and is deflected onto perforated surface 124. This seed 601 is lifted upward through air and mixing chamber 505. A second stream of air flows upward through air bypass channel 130 and is recombined with the air-entrained seed at outlet port 22. The seed is then provided to a seed meter 36 through conduit 45. A trap insert 603 is removably inserted in the air entrainment device 12A distribution so as to subtend its seed throat 503 to stop the flow of seed from hopper 10 should the operator find it necessary, such as during transit over non-planting area, or when its base 121A is lowered to clear blockage or remove a foreign object or unwanted material.

While particular embodiments have been shown and described, it will be apparent to those skilled in the art that changes and modifications may be made without departing from the broader aspects of Applicants' contribution. The actual scope of the protection sought is intended to be defined in the following claims when viewed in their proper perspective based on the prior art.

The invention claimed is:

1. A seed delivery service, comprising:
a frame that includes an air permeable surface;
a seed input port through Which seed can be received and deposited on the air permeable surface;
an air flow channel through which an air stream can be directed through the air permeable surface such that the seed is lifted from the air permeable surface; and
a bypass channel through which a portion of the air stream can be directed, wherein the air stream navigating the bypass channel does not pass through the air permeable surface and seed;
wherein the lifted seed is combined with the air stream directed through the bypass channel at a location at least partially above the air permeable surface to direct the seed out of the frame.

2. The seed delivery device of claim 1, wherein the portion of the air stream in the bypass channel is at least partially parallel to the air flow channel lifting the seed from the air permeable surface.

3. The seed delivery device of claim 2 further comprising an outlet port through which the air stream and the seed can traverse after the air stream lifts the seed from the air permeable surface.

4. The seed delivery device of claim 3, wherein the seed input port is at least partially defined by a partition, the partition separating the seed input port from the outlet port.

5. The seed delivery device of claim 4, wherein the air permeable surface comprises a plurality of substantially circular holes defined therein.

6. The seed delivery device of claim 5, wherein the air permeable surface further comprises a plurality of perforated sections and non-perforated dividing lines, the perforated sections comprising the plurality of substantially circular holes.

7. The seed delivery device of claim 6, wherein the air permeable surface further comprises a surface area, and wherein the perforated sections comprise at least 75% of the air permeable surface's surface area, and wherein the non-perforated dividing lines comprise at least 10% of the air permeable surface's surface area.

8. The seed delivery device of claim 3, wherein the outlet port comprises a plurality of outlet ports.

9. The seed delivery device of claim 1, wherein the seed input port is further at least partially defined by an inclined surface, and the frame further comprising a seed chamber including at least one sidewall.

10. A seed delivery service, comprising:
a frame;
a seed input port through which seed can be received and deposited, wherein the seed input port is at least partially defined by a partition;
an air flow channel through which an air stream can be directed through an air permeable surface;
a bypass channel through which a portion of the air stream can be directed such that said portion does not pass through said seed; and
an outlet port through which the air stream and the seed can traverse, wherein the partition separates the seed input port from the outlet port;
said air stream passing through the bypass channel and said air stream passing through the air permeable surface combining at said outlet port.

11. The seed delivery device of claim 10, wherein the seed input port is further at least partially defined by an inclined surface, and the frame further comprising a seed chamber including at least one sidewall.

12. The seed delivery device of claim 10, wherein the outlet port comprises a plurality of outlet ports.

13. The seed delivery device of claim 10, further comprising an air permeable surface.

14. The seed delivery device of claim 13, wherein the air permeable surface further comprises a surface area, a plurality of perforated sections, and non-perforated dividing lines, and wherein the plurality of perforated sections comprise over 75% of the perforated surface's surface area.

15. A seed delivery device, comprising:
a frame defining a seed chamber, wherein the frame includes at least one sidewall and an air permeable surface;
a seed input port through which seed can be received and deposited on the air permeable surface;
an air input channel through which an air stream can be introduced into the seed chamber and directed through the air permeable surface; and
an outlet port through which air and seed can exit the seed chamber;
said air stream passing through the air input channel and air permeable surface further directed through said outlet port with said seed.

16. The seed delivery device of claim 15, wherein the seed input port is at least partially defined by a partition, the partition separating the seed input port from the outlet port.

17. The seed delivery device of claim 13, wherein the seed input port is further at least partially defined by an inclined surface.

18. The seed delivery device of claim 17, further comprising a bypass channel through which a portion of the air stream can be directed, wherein the air stream navigating the bypass channel does not pass through the air permeable surface.

19. The seed delivery device of claim 17, wherein the air permeable surface comprises a plurality of substantially circular holes defined therein.

20. The seed delivery device of claim 17, wherein the air permeable surface comprises a surface area, a plurality of perforated sections, and non-perforated dividing lines, and wherein the plurality of perforated sections comprise over 75% of the perforated surface's surface area.

* * * * *

UNITED STATES PATENT AND TRADEMARK OFFICE
CERTIFICATE OF CORRECTION

| | |
|---|---|
| PATENT NO. | : 9,253,940 B2 |
| APPLICATION NO. | : 13/858876 |
| DATED | : February 9, 2016 |
| INVENTOR(S) | : Wilhelmi et al. |

It is certified that error appears in the above-identified patent and that said Letters Patent is hereby corrected as shown below:

In the claims,

Column 5, Claim 1, line 3: delete the word "Which" and replace with --which--.

Column 6, Claim 17, line 48: delete the number "13" and insert the number --16--.

Signed and Sealed this
Ninth Day of August, 2016

Michelle K. Lee
*Director of the United States Patent and Trademark Office*